United States Patent Office 3,301,853
Patented Jan. 31, 1967

3,301,853
PROCESS COMPRISING REACTING AN AMINE, ETHYLENE OXIDE AND SILICA TO OBTAIN QUATERNARY AMMONIUM SILICATES
Helmut Hans Wilhelm Weldes, Havertown, Pa., assignor to Philadelphia Quartz Company, Philadelphia, Pa., a corporation of Pennsylvania
No Drawing. Original application Aug. 15, 1961, Ser. No. 131,490, now Patent No. 3,239,521, dated Mar. 8, 1966. Divided and this application Oct. 21, 1965, Ser. No. 500,326
1 Claim. (Cl. 260—247.7)

INTRODUCTION

This is a division of application Serial No. 131,490, filed August 15, 1961, now Patent 3,239,521, and is a continuation-in-part of co-pending application Serial No. 50,877, filed on August 22, 1960, now Patent 3,239,549.

This invention generally relates to the production and use of soluble sodium-free hydroxylated organic quaternary nitrogen silicates. In one particular embodiment this invention relates to the production and use of sodium-free tetraethanolammonium silicates and derivatives thereof.

BACKGROUND

Water-soluble alkali metal silicates are favored components of (1) refractory and rapid-setting cements, (2) inorganic coatings having a refractory or weather-resistant character and (3) numerous adhesives. However, in certain uses they have drawbacks which are associated with the alkali metal component, and it has long been an objective to prepare a soluble silicate useful in these various fields which is free of any alkali metal component. For instance, in a refractory cement the presence of the alkali metal salt lowers the softening point of the cement because of the fluxing characteristic of the salt. Efforts to overcome this have been made by increasing the silica ratio of the soluble silicate but some alkali metal salt always remains even after neutralization and excessive washing. Furthermore, the alkali metal silicate solutions increase in viscosity rapidly as the concentration increases at high silica ratios so that in commercial solutions prepared at about the 4.0 $SiO_2$:$Na_2O$ ratio the solid content will be no higher than 30%. Furthermore, where the silica ratio is high, the softening point of the anhydrous sodium silicate also is high.

One aspect of this invention broadly involves the discovery of soluble amorphous sodium-free organic N-containing silicates which overcome the aforementioned drawbacks of soluble alkali metal silicates. In another specific aspect of the invention, I believe that I am the first person to discover sodium-free tetraethanolammonium silicate and methods for producing same. *The tetraethanolammonium silicate which I have discovered does not appear to crystallize readily since I have not been able to obtain crystals after many attempts.*

THE INVENTION

This invention broadly encompasses amorphous compositions having the general oxide formula with continuously variable ratios:

$$X(N_nR_p{}^s)_2O \cdot YSiO_2 \cdot ZH_2O$$

In the above formula:
N represents a nitrogen atom;
$n$ is a small integer, less than 10 and preferably less than five;
X, Y and Z represent numbers defining the relative amounts of each of the component parts of the compound. X is 1, Y is preferably between 0.5 and 20, and Z is preferably between 0 and 99, and wherein up to four R groups are associated with each N;

R represents organic radicals having between 1 and 20 carbon atoms, at least two of said organic radicals consisting of omega hydroxy alkyl groups (preferably two or more of these R groups are ethanol groups and the others derivatives of ethanol groups);
$p$ is at least 4 and up to $4n$ and is equal to the number of R groups; and
$s$ is an integer from 1 to $p$, indicating the number of different types of R groups.

According to one specific embodiment the invention relates to the production of amorphous compositions having the formula:

$$X(NR^1R^2R^3R^4)_2O \cdot YSiO_2 \cdot ZH_2O$$

wherein N, X, Y and Z have the significances noted above and $R^1$, $R^2$, $R^3$ and $R^4$ represent alkanol radicals containing between about 1 and 20 carbon atoms.

The tetraethanolammonium silicates of this invention can form aqueous solutions of over 50% solids content at viscosities at which the solution is readily useful (such as 2 poises). Such solutions may have as high as 15 moles of $SiO_2$ to 1 mole of organic base and yet be readily soluble and have a relatively low melting point which is representative of organic compounds rather than the inorganic salts. The organic base portion can be readily removed, leaving a silica cement in place. This may be accomplished either by heating or by neutralization and removal of the soluble organic base salt. Thus, this new compound and its derivatives have an important place in the formulation of refractory and rapid-setting cements as well as in coatings for roofing granules and shingles, in special adhesives, in investment molds for casting metals, and the like.

I have found that tetraethanolammonium silicates and their derivatives form stable, water-free compositions which are easily soluble in water. These compositions have a range of mole ratio of $SiO_2$ to quaternary ion from about 0.5 to 1.0 (i.e. a mol ratio of $SiO_2$ to quaternary oxide of about 1 to 2) or lower, to about 15 to 1 (i.e. about 30 to 1 on the quarternary oxide ratio), or higher. These pure compositions vary from viscous oily liquids at the lower ratios to pliable solids in the higher range and, finally, to brittle solids. At a ratio of about 21, the dehydrated solid becomes insoluble. These compositions below about ratio 15 are miscible in all proportions with water. The silica is present in aqueous solutions of such compositions largely as crystalloidal silica under equilibrium conditions. They have a relatively high pH but a viscosity much lower than that of a sodium silicate solution having a similar solids content and silica ratio. Soluble silicate solutions above a molecular ratio of 4.0 are so difficult and costly to manufacture and so relatively unstable at high concentrations that they have never been commercially available. Thus, in the sodium system a ratio of 4.0 has been considered the maximum. As pointed out above, this 4.0 ratio material can be concentrated usefully only to about 30% solids whereas the 12 ratio organic base silicate will readily form solutions of reasonable viscosity at more than 50% solids content.

METHODS OF PREPARATION

The compounds of this invention may be prepared in a number of ways. Such methods include, for example:
(a) Removing the alkali metal ion from alkali metal hydroxylated quaternary ammonium silicates by use of a suitable base exchange resin;
(b) Dissolving sodium-free silica in sodium-free hydroxylated organic quaternary ammonium bases;
(c) Dissolving sodium-free silica in sodium-free tetraethanolammonium silicate solutions;

(d) The sodium may be leached from the less soluble sodium hydroxylated quaternary ammonium silicate crystals;

(e) Reacting ammonia or an amine and ethylene oxide with finely divided silica hydrate or silica gel, or a colloidal silica sol.

The following examples are illustrative of the invention.

*Example 1.—Preparation of sodium-free hydroxylated organic ammonium silicates*

As is (e) above, it is possible to form a pure sodium-free hydroxylated organic ammonium silicate by reaction of ammonia and ethylene oxide and a finely divided silica, such as Quso-FF or a colloidal sol, such as Ludox.

Moreover, since more than a trace of silica is required to bring about the reaction for the formation of the sodium-free hydroxylated organic ammonium silicate, it does appear that the silica enters into the reaction and that it is not a mere formation of the tetraethanolammonium hydroxide with a subsequent solution of the silica present. Thus I appear to have a new process and a new product. Examples 1 and 2 are presented to show that the reaction between ammonia and ethylene oxide occurs in the presence of silica either as a finely divided solid or as an alkali free sol. The product obtained with the finely divided silica, Quso-FF, is a hydroxylated quaternary ammonium silicate containing a quaternary ammonium radical of an unexpectedly high molecular weight. It is an oil, soluble in water and methanol, but insoluble in other common organic solvents. Solutions of quaternary ammonium silicates containing 10 to 15% by weight of $SiO_2$ can be prepared in this way. The reaction with the colloidal silica sol Ludox leads to a quaternary ammonium silicate also substantially free of inorganic alkali but with a lower molecular weight quaternary ion. This is obtained with good yield provided the silica is present in a substantial amount. The oily material obtained from this reaction is soluble in water. Additionally, the product of the sol reaction contains a larger amount of colloidal silica than crystalloidal silica but on standing the colloidal silica tends to change over into the crystalloidal form and the opalescence of the solution becomes less.

As a specific instance, finely divided silica, Quso-FF, was used in the following formula:

550 grams of water were blended with 79 grams of Quso-FF and then with 24 grams of aqueous ammonia (29%). This blend was poured into a 1 liter autoclave equipped with a stirrer and connected to a low temperature reflux condenser through a valve. The autoclave was also connected to a flask containing 74 g. of ethylene oxide. The ethylene oxide was distilled into the reaction mixture while it was being agitated vigorously at a temperature held between 25 and 30° C. In about an hour and a half all the ethylene oxide had been distilled over and the autoclave was closed but agitation was continued for a total of 4 days. Any undissolved Quso-FF was filtered on a Buchner funnel with filter paper and carbon black. The product was designated as solution A and had a mol ratio of 1 quaternary ion to 1.22 of $SiO_2$ at a pH of about 13. This corresponds to an oxide ratio of 1 quaternary ammonium oxide to 2.44 $SiO_2$.

Part of solution A was concentrated in vacuo at 40° C. (136 grams of water were removed from a total of 168 grams) leaving a very viscous, clear, slightly yellowish solution B (containing 39.15% quaternary ion, 15.85% $SiO_2$ and 45% water). This solution B was then further evacuated at 43° C. and 5½ more grams of water were removed, leaving 27.3 grams of a very viscous, clear oil. Most of this oil (c) dissolved very quickly in methanol but not in other organic solvents. Residual silica was filtered out as before. Solutions of various concentrations in methanol could be obtained by distillation.

Because of the interference of the silicate ion in the analytical procedure, it was necessary to analyze these mixtures by a rather complex procedure. An excess of 2 N HCl was added, precipitating out all the $SiO_2$ and converting the amine to the chlorides. This mixture was then diluted with water and the silica was filtered out. The amine chloride were titrated electrometrically with standardized alkali such as 0.2 N sodium hydroxide. It was thus possible to differentiate between different amines. By this means it was found that oil, such as (c) above, contained 31.2% of quaternary ammonium ion calculated as $N^+(C_2H_4OH)_4$ and 9.5% of triethanolamine. By treatment with cationic and anionic exchangers it was found that all the organic groups were attached to amines and that, therefore, a high molecular weight ethylene oxide compound was involved which had a molecular weight of 458. On this basis the oil was found to contain 73.65% of quaternary ion, 15.15% of $SiO_2$ and 9.47% of triethanolamine. This corresponds to the oxide ratio, omitting the triethanolamine, of $(N_{2.2}R_{8.8})_2O:3.2SiO_2:11.6H_2O$.

*Example 2.—Preparation of sodium-free hydroxylated organic ammonium silicates*

Another reaction using Ludox LS, 222 grams, was carried out with 24 grams of aqueous ammonia and 74 grams of ethylene oxide.

In carrying out the reaction, the ammonia was mixed with the Ludox in a reaction flask equipped with a stirrer and a thermometer, and the ethylene oxide was distilled into the mixture over a period of about 1 hour. Agitation was continued for about 7 hours more, but the solution remained in the flask overnight. The solution obtained contained 21.0% of quaternary ion, 21.6% of $SiO_2$ and 57.5% of $H_2O$; with the quaternary ion present as $N^+(C_2H_4OH)_4$; 83.1% conversion to this material was obtained. At first there was only 0.24% of crystalloidal silica, and 21.3% of colloidal silica, but after 4 days there was 4.5% crystalloidal silica and in 18 days, 6.8% crystalloidal silica and 14.8% colloidal $SiO_2$.

An oil obtained by distilling the water from this mixture in vacuo at 40° C. was viscous but clear. It contained 43.45% of quaternary ion and 39.85% of $SiO_2$. This corresponds to $[N(C_2H_4OH)_4]_2O:5.9SiO_2:8.3H_2O$.

*Example 3.—Preparation of sodium-free hydroxylated organic ammonium silicates*

In this reaction 79 grams of Quso-FF were blended with 550 grams of water, and 24 grams of 29% aqueous ammonia were added to this mixture. Instead of using an autoclave for the reaction, as in Example 1, these were combined in a glass flask equipped with a stirrer and connected through one valve to a low-temperature reflux condenser, and through another valve to a flask of ethylene oxide. The ethylene oxide was distilled into the vigorously agitated mixture while the temperature was held between 25 and 30° C. 74 grams of ethylene oxide were added over a period of 55 minutes. At the start, the slurry was milky. The reaction was allowed to continue for another 7 hours and then left overnight at room temperature. At the end of 7 hours the solution was a thin, milky liquid with a slight odor of ethylene oxide which had disappeared by the next morning. The mixture was filtered on a Buchner funnel through a bed of carbon black and the clear filtrate diluted to 500 parts with water. Since no other alkali was present, the organic ion was determined as the total titratable alkali. Electrometric titration agreed with this value. The silica was determined by volumetric titration using the standard molybdate colorimetric method. Since the silica was completely crystalloidal, the same result was obtained whether or not NaOH was used in the procedure. The solution contained 0.84% silica and 5.66% of quaternary ion, thus having a mole ratio of 0.48 $SiO_2$:1.0 quaternary. This corresponds to an oxide ratio of 0.96$SiO_2$:1.0 quaternary ammonium oxide.

*Example 4.—Preparation of sodium-free hydroxylated organic ammonium silicates*

In a reaction flask equipped with a stirrer, thermometer, a low-temperature reflux condenser and a gas inlet tube, 30 grams of aqueous 29% $NH_3$ solution were admixed with 1110 grams of Ludox LS. No gelation or coacervation occurred, and 92.5 grams of ethylene oxide were distilled into the agitated mixture through the gas inlet tube. The temperature was maintained between 24 and 26.5° C. The ethylene oxide was distilled over in the course of about one hour, and the reaction was continued for 6 more hours and then left at room temperature overnight in a closed vessel. The next morning the water was distilled off by vacuum distillation. Part of the solution was removed when it contained 50% $SiO_2$ and the remainder was taken to dryness.

In the 50% solution, the analysis was 14.39% of quaternary ion and 52.53% of $SiO_2$ with a mole ratio of 11.81 of $SiO_2$:1.0 of quaternary ion. This solution had a specific gravity at 20°/20° of 1.512 and a viscosity at 20° C. of 2.8 poise. The material taken to dryness was solid but easily soluble in water, even though the mole ratio was 11.81 $SiO_2$ to 1 of quaternary ion. This corresponds to a ratio of 1.0 quaternary ammonium oxide: 23.65$SiO_2$:49.8$H_2O$. It was not soluble in methanol or ordinary organic solvents. With increasing silica ratio the solubility in methanol declines.

Following the same procedure, a composition having a mole ratio of about 21 was prepared by allowing 444 grams of Ludox HS, 6 grams of aqueous 29% $NH_3$ and 18.5 grams of ethylene oxide to react. After the reaction was completed and the mixture contained in a closed vessel overnight, the water was distilled off. This left a solid, white material which was very brittle and easily broken into small particles. It appeared to be insoluble in water. Thus, the limiting ratio at which the solid anhydrous material was completely miscible with water is probably about 15 to 16.

*Example 5.—N,N-bis (β-hydroxyethyl) moropholinium silicate*

A solution of 29 grams morpholine in 534 grams Ludox was placed into a three-necked flask equipped with stirrer, low-temperature reflux condenser, inside thermometer, and gas inlet tube. Ethylene oxide (29.4 grams) was introduced over a period of 19 minutes into the agitated mixture. The temperature of the mixture rose rapidly and was kept between 25° and 30° C. by cooling the reaction flask. Agitation was continued for 3 hours and the mixture kept in a closed vessel at room temperature overnight. Then all the water was removed by distillation in vacuo at temperatures below 40° C. The residue, a dry, white, very brittle solid had an analysis of 29.81% quaternary and 69.44% $SiO_2$, and a mole ratio of 1 quaternary:6.84$SiO_2$. This corresponds to an oxide ratio of 1 quaternary ammonium oxide to 13.68$SiO_2$. It was very easily soluble in water.

*Example 6.—Hexakis (β-hydroxyethyl) ethylene diammonium silicate*

The reaction was carried out in exactly the same way as described for Example 5 using 70 grams tetrahydroxyethyl ethylene diamine, 475 grams Ludox, and 26.1 grams ethylene oxide. The residue, a transparent, slightly tacky solid, contained 38.86% quaternary, 56.41% $SiO_2$, and had a mole ratio of 1 quaternary:7.9$SiO_2$. Because the quaternary ion includes 2 quaternary nitrogens the oxide and ion ratios are identical. It also was easily soluble in water.

A number of the materials used in the preceding examples are described as follows:

Ammonium hydroxide was the 28–30% aqueous Reagent Grade supplied by Allied Chemical Co.

Quso-FF, a finely divided silica, also obtained from the Philadelphia Quartz Company, has an ignited loss of 13.0%, with 7.2% of free water and 5.8% of bound water. It analyzed approximately 85% $SiO_2$, with a surface area of about 280 m.$^2$/g.

Two colloidal silica sols sold by the Du Pont de Nemours Co. as Ludox HS and Ludox LS had the following composition:

| Physical Properties | Ludox HS | Ludox LS |
|---|---|---|
| Percent colloidal silica as $SiO_2$ | 30 | 30 |
| Ratio, wt. $SiO_2$/$Na_2O$ | 95 | 285 |
| Viscosity at 25° C. cps | 3.6 | 13 |
| pH at 25° C | 9.8 | 8.4 |
| Surface area (BET), m.$^2$/g | 210 | 210 |
| Particle diameter, mμ | 15 | 15 |
| Chloride as NaCl, percent | 0.04 | 0.002 |
| Sulfate as $Na_2SO_4$, percent | 0.05 | 0.006 |

The ethylene oxide with a purity of about 99.5% was supplied by Matheson Company, Inc.

ANALYTICAL PROCEDURES

In analyzing the quaternary ammonium silicates, special procedures are necessary.

*Ignition loss.*—The ignition loss is determined with a sample of quaternary silicate weighing one gram. This sample is heated in a covered platinum crucible, raising the temperature very, very slowly. If the ignition is carried out too fast, silicon carbide forms and it is almost impossible to burn it off. Therefore the crucible is heated extremely slowly on one side until all of the organic matter has charred completely. This procedure takes about one hour, then the heat is increased slowly to the full blast of a Tirrel burner and continued until the sample has turned completely to either white powder or a clear white melt. This takes about two more hours. When the sample is white in color it is transferred to a Fisher burner and heated full blast for a further half hour.

*Quaternary ammonium base.*—The nitrogen content is determined using the Kjeldahl procedure with special modifications as indicated. About 0.75 gram of the silicate is taken as a sample. This sample is weighed into a 500 ml. round-bottom, two-necked flask and 10 grams of dehydrated $K_2SO_4$ and 2 grams of dehydrated $CuSO_4$ are added thereto. After admixing 12 ml. of concentrated $H_2SO_4$, a reflux glass tube is set on top of the flask and the mixture heated over a wire gauze in a hood slowly and cautiously, close to the boiling point of the sulfuric acid. Heating is continued until the originally dark solution becomes clear and no dark specks remain. This digestion period takes between 3 to 24 hours, depending on the composition. After the contents are cooled to room temperature, 100 ml. distilled water is added carefully through the reflux tube while swirling the contents. Then a few Alundum boiling stones are added and a magnetic stirrer. The reflux glass tube is removed and the flask is connected to the distillation equipment. The end of the condenser dips into a receiver containing 100 ml. of distilled water with excess 0.2 normal HCl over the expected equivalent of ammonia. About 130 ml. of 6-normal sodium hydroxide are added to the reaction flask through a dropping funnel while stirring with a magnetic stirrer. When all of the sodium hydroxide is added, the reaction mixture is heated for an hour to vigorous boiling. The ammonia formed during the digestion is driven over into the acid solution and after completion the free hydrochloric acid is back titrated with 0.2-normal NaOH.

*Silica determination.*—Silica in solution may be determined using the usual volumetric method and the gravimetric method may be used for insoluble silica. (Vail, Soluble Silicates, vol. I, p. 40.)

PRODUCT PROPERTIES

*Viscosity.*—The aqueous solutions of the sodium-free products in accordance with this invention are quite alkaline and concentrated solutions are quite viscous. For instance, a solution of 74% of a tetraethanolammonium silicate having a ratio of $0.53SiO_2$ to quaternary ion (i.e. $1.06SiO_2$ to 1 quaternary ammonium oxide) had a pH of 12.8 and a viscosity at 20° C. of 8.0 poises. At 50° C. the viscosity had dropped to 1.1 poises. On the other hand, a solution of a product containing 70% of 8.7 ratio ($SiO_2$ to quaternary ion or $17.4SiO_2$ to quaternary ammonium oxide) material with 30% of water had a pH of 11.08 and a viscosity at 20° C. of 14.1 poises; at 50° C. the viscosity was 6.0 poises. A solution containing 50% silica prepared from a tetraethanolammonium silicate of the mole ratio of $11.8SiO_2$ to 1.0 quaternary ion (or $23.6SiO_2$ to 1 quaternary ammonium oxide) had a viscosity at 20° C. of 2.8 poises.

*Gelation vs. pH.*—A sodium-free quaternary tetraethanolammonium silicate having a ratio of $2.74SiO_2:1.0$ quaternary ion (or $5.48SiO_2$ to 1 quaternary ammonium oxide) and a concentration of 42.08% $SiO_2$ was diluted with water to 30% $SiO_2$ and gradually neutralized with sulphuric acid. The initial pH was 11.3. At a pH of about 10.5, the mixture became very viscous but did not gel, and gradually the pH rose again to 10.8 during the course of 24 hours. When this was again reduced to a pH of 10.5, the mixture appeared to gel in about 2 to 4 minutes but reliquefied overnight, forming a clear, very viscous solution. Again, at a pH of 10.4, a gel-like structure formed after 1.5 minutes, but this also reliquefied after 4 days, forming a clear and viscous solution. At a pH of 9.85 a gel formed which did not redissolve or reliquefy over a period of more than 2 weeks.

On the other hand, a 3% solution was treated with 3% $H_2SO_4$ with a pH lowered gradually to about 2. In these solutions no gel formed, but rather a finely divided silica. This lack of gelation must be related to the fact that the silica in these solutions is crystalloidal rather than colloidal.

*Films.*—A sodium-free tetraethanolammonium silicate having a mole ratio of $8.7SiO_2$ (or $17.4SiO_2$ to 1 quaternary ammonium oxide) had a concentration of 45.7% $SiO_2$ and 17.02% of quaternary. Films were cast on small metal dishes and dried at room temperature, 100°, 200°, 400° and 800° C. The weight loss and solubility of these films were determined. The alkali in the films remained quite soluble even after drying at 100° C., but on drying to 200° C., and especially above 200° C., much less alkali could be dissolved out. The silica in these films, even those dried at room temperature, was rather insoluble. The amount of silica dissolved by boiling 2.5 grams of a film dried at room temperature in 50 ml. of water 15 minutes was 2.7%. This was reduced to 1.2% after heating at 400°, and to less than 1% after heating at 800°.

A more alkaline material having a ratio of 4.8 (or $9.6SiO_2$ to 1 quaternary ammonium oxide) was used as a solution containing 41.0% $SiO_2$ and 27.55% of quaternary ion. 59% of the silica was soluble after drying at 100° but after drying at 200° only 2.6% was soluble, and at 400°, and higher, less than 1% was soluble. These films had no adhesion to metal or glass. The quaternary ion was soluble in both films after curing at 100° C. At 200° C., and above, it apepars that the organic ion breaks down and evaporates to some extent. About 50% was lost by curing 30 minutes at 200° C., and this appears to be more noticeable in the ratios containing higher quaternary nitrogen alkali.

The more siliceous films crack completely when dried at room temperature for 16 hours, whereas low ratio films, for instance those having a ratio of about 4, form hard, smooth surfaces at room temperature which do not change for almost 4 days, at which time a light cracking around the edges is observed. Neither do they crack at 100° C. However, on curing at 200° C. these films do crack and turn tan in 5 minutes. The films all break down and turn brown when cured at 400° C. and cannot be scrubbed off the plates.

The film stability may be increased by adding material such as urea or Polyox WSR 35, a high molecular weight ethylene oxide polymer sold by Union Carbide Chemicals Co. Glycerine was also good in the more alkaline ratio materials. The same may be said for cane sugar, sorbitol and hexamethylenetetramine.

*Adhesives.*—An adhesive solution was prepared from a sodium-free tetraethanolammonium silicate having a silica ratio of 5.44 (or $10.9SiO_2$ to 1 quaternary ammonium oxide), with a total solids content of 68.27%. The viscosity at 20° C. was 2.33, and the pH was 11.4. After setting at room temperature, B flute single face kraft board bonded with this adhesive had a pin adhesion strength of 43.4 pounds per 12 inches of flute tip. Setting the bond at higher temperatures reduced this strength as, for instance, at 94° C. the strength was only 37.4 lbs., and at 232° C. the strength was only 8 lbs. per 12 inches of flute tip. In all cases, the wet strength was less than one-half pound.

Apparently because of the crystalloidal nature of the solutions, those solutions having higher silica ratios gave weaker bonds.

The alkali metal silicates and alkali metal quaternary ammonium silicates will form stable solutions with insignificant amounts of most water miscible organic solvents. For instance, a solution of sodium silicate having a mole ratio of $1Na_2O:3.22SiO_2$ and containing 15% $SiO_2$ will accept only about 0.5% of either methanol, ethanol, isopropanol, acetone, dioxane or tetrahydrofuran. A sodium tetraethanolammonium silicate with a mole ratio of $1Na_2O:1.1$ quaternary ion:$3.9SiO_2$ (or $1Na_2O:0.55$ quaternary ammonium oxide:$3:9SiO_2$) in an aqueous solution with 15% $SiO_2$ will accept less than 1% of the above water miscible solvents. On the other hand, alkali free tetraethanolammonium silicates with mole ratios varying from 1 quaternary ion:$2.74SiO_2$ to $1:10.42$ (or 1 quaternary ammonium oxide:$5.48SiO_2$ to $1:20.84$) in aqueous solutions containing 15% $SiO_2$ will accept from 30 to 80% of the above solvents, and such aqueous solutions containing 50% $SiO_2$ will accept from 20 to 40% of these solvents. Miscibility increases with decreasing silica concentration and ratio. It also tends to decrease in the order methanol, ethanol, isopropanol, acetone, dioxane, tetrahydrofuran. These results suggest the application of my new sodium-free quaternary ammonium silicates in paints, coatings and liquid detergent systems, for example, in which soluble silicates were never compatible heretofore.

In the foregoing specification, whenever the term "sodium" is referred to it will be understood that the result would be substantially the same when using other alkali metals such as potassium, lithium, etc.

What is claimed is:

A method for producing an amorphous quaternary nitrogen composition having the formula:

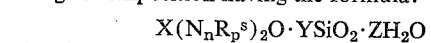

wherein:

$n$ is a small integer between 1 and 10;

X, Y and Z represent numbers defining the relative amounts of each of the component parts of the compound and X is 1, Y is between 0.5 and 20, and Z is between 0 and 99, wherein from one to four R groups are associated with each N;

R represents organic radicals having between 1 and 20 carbon atoms, at least two of said organic radicals consisting of omega hydroxy alkyl groups, $p$ is equal to the number of R groups and is at least 4 and up to $4n$, $s$ is an integer from 1 to $p$, indicating the number of different R groups, which comprises reacting together the following three materials at a temperature not exceeding about 30° C.:
(a) a material selected from the group consisting of ammonia and an amine, and
(b) ethylene oxide, and
(c) a material selected from the group consisting of finely divided silica hydrate, silica gel and a colloidal silica gel.

References Cited by the Examiner
UNITED STATES PATENTS
2,137,314  11/1938  Ulrich et al. _____ 260—567.6

ALEX MAZEL, *Primary Examiner.*
HENRY R. JILES, *Examiner.*
J. TOVAR, *Assistant Examiner.*